United States Patent
Yoneda et al.

(10) Patent No.: US 9,911,456 B2
(45) Date of Patent: Mar. 6, 2018

(54) SPINDLE MOTOR AND DISK DRIVE APPARATUS

(71) Applicant: Nidec Corporation, Kyoto (JP)

(72) Inventors: Tomohiro Yoneda, Kyoto (JP); Takeshi Ohiro, Kyoto (JP); Takayuki Ishino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/438,953

(22) Filed: Feb. 22, 2017

(65) Prior Publication Data

US 2017/0249968 A1   Aug. 31, 2017

(30) Foreign Application Priority Data

Feb. 25, 2016 (JP) ................. 2016-034377

(51) Int. Cl.
| | |
|---|---|
| *G11B 19/20* | (2006.01) |
| *G11B 33/02* | (2006.01) |
| *G11B 33/14* | (2006.01) |
| *H02K 7/08* | (2006.01) |

(52) U.S. Cl.
CPC ........ *G11B 19/2036* (2013.01); *G11B 33/027* (2013.01); *G11B 33/1473* (2013.01); *H02K 7/08* (2013.01)

(58) Field of Classification Search
None
See application file for complete search history.

(56) References Cited

U.S. PATENT DOCUMENTS

| 7,271,974 B2 | 9/2007 | Fukuyama et al. |
| 7,531,928 B2* | 5/2009 | Yamamoto ............ F16C 17/107 310/67 R |
| 8,143,751 B2* | 3/2012 | Iguchi ................ G11B 19/2009 310/67 R |
| 8,687,316 B2* | 4/2014 | Watanabe ............ H02K 5/1675 360/99.08 |

(Continued)

FOREIGN PATENT DOCUMENTS

| JP | 2006-040423 A | | 2/2006 | |
| JP | 2013221546 A | * | 10/2013 | ........... H02K 5/1675 |

*Primary Examiner* — Will J Klimowicz
(74) *Attorney, Agent, or Firm* — Keating & Bennett, LLP

(57) ABSTRACT

A cup portion of a base member includes a cylindrical portion and a bottom plate portion. The cylindrical portion is arranged to be coaxial or substantially coaxial with a central axis extending in a vertical direction. The bottom plate portion is defined integrally with the cylindrical portion, and is arranged to close a lower portion of the cylindrical portion. A bearing mechanism is arranged inside of the cup portion. An outer circumferential surface of the bearing mechanism and an inner circumferential surface of the cylindrical portion have an adhesive layer arranged therebetween. In one preferred embodiment of the present invention, a communicating hole passing through the cylindrical portion in a direction that crosses an axial direction is defined in the vicinity of a junction of the cylindrical portion and the bottom plate portion. In another preferred embodiment of the present invention, the base member includes a communicating hole passing through the bottom plate portion in the axial direction.

11 Claims, 12 Drawing Sheets

(56) References Cited

U.S. PATENT DOCUMENTS

2002/0025090 A1* 2/2002 Sakatani ............... F16C 17/026
  384/107
2007/0019894 A1* 1/2007 Yamamoto ............ F16C 17/107
  384/107

* cited by examiner

SPINDLE MOTOR AND DISK DRIVE APPARATUS

CROSS REFERENCE TO RELATED APPLICATIONS

This application claims the benefit of priority to Japanese Patent Application No. 2016-034377 filed on Feb. 25, 2016. The entire contents of this application are hereby incorporated herein by reference.

BACKGROUND OF THE INVENTION

1. Field of the Invention

The present invention relates to a spindle motor, a disk drive apparatus, and an insertion method.

2. Description of the Related Art

Hard disk drives typically have spindle motors arranged to rotate disks installed therein. A known hard disk drive and a known spindle motor are described in, for example, JP-A 2006-040423. Paragraph of this publication states that the spindle motor (SPM) is fixed to a base of the hard disk drive (HDD). In addition, paragraph of the publication states that a low-density gas having a density lower than that of air, such as, for example, helium, is used as an atmosphere inside a hard disk assembly (HDA).

A case of the hard disk drive is arranged to be substantially airtight in order to keep an interior space thereof clean. In particular, the low-density gas, such as helium, tends to easily pass through even a minute gap. Therefore, in the case where an interior of the case is to be filled with the low-density gas as in the case of the hard disk drive described in JP-A 2006-040423, extremely high airtightness is required. In order to improve the airtightness of the case, it is preferable that the number of through holes defined in a base thereof is decreased.

Meanwhile, a bearing mechanism arranged to support a rotating portion of the spindle motor is fixed to the base of the hard disk drive. In order to fix the bearing mechanism without defining a through hole in the base, it is conceivable, for example, to provide a cup portion having a bottom and being cylindrical in the base, and insert and arrange the bearing mechanism in the cup portion. However, when the bearing mechanism is inserted into the cup portion having the bottom and being cylindrical, resistance against insertion of the bearing mechanism into the cup portion may be increased because gas cannot be discharged out of the cup portion. This will reduce efficiency in an assembling operation, and make it difficult to accurately position the bearing mechanism with respect to a base member.

SUMMARY OF THE INVENTION

Preferred embodiments of the present invention provide a technique for reducing resistance when a bearing mechanism is inserted into a cup portion provided in a base member of a spindle motor.

According to a preferred embodiment of the present invention, there is provided a spindle motor including a base member, a bearing mechanism fixed to the base member, and a rotating portion rotatably supported by the bearing mechanism. The base member includes a cup portion including a cylindrical portion arranged to be coaxial or substantially coaxial with a central axis extending in a vertical direction, and a bottom plate portion defined integrally with the cylindrical portion, and arranged to close a lower portion of the cylindrical portion. The bearing mechanism is arranged inside of the cup portion. An outer circumferential surface of the bearing mechanism and an inner circumferential surface of the cylindrical portion have an adhesive layer arranged therebetween. The cup portion includes at least one communicating hole in a vicinity of a junction of the cylindrical portion and the bottom plate portion, the communicating hole passing through the cylindrical portion in a direction that crosses an axial direction.

According to another preferred embodiment of the present invention, there is provided a spindle motor including a base member, a bearing mechanism fixed to the base member, and a rotating portion rotatably supported by the bearing mechanism. The base member includes a cup portion including a cylindrical portion arranged to be coaxial or substantially coaxial with a central axis extending in a vertical direction, and a bottom plate portion defined integrally with the cylindrical portion, and arranged to close a lower portion of the cylindrical portion. The bearing mechanism is arranged inside of the cup portion. An outer circumferential surface of the bearing mechanism and an inner circumferential surface of the cylindrical portion have a first adhesive layer arranged therebetween. The base member includes a communicating hole arranged to pass through the bottom plate portion in an axial direction. The communicating hole has a second adhesive layer arranged therein.

According to yet another preferred embodiment of the present invention, there is provided a method for inserting a bearing mechanism into a cup portion in a process of manufacturing a spindle motor including a base member including the cup portion, the bearing mechanism fixed to the base member, and a rotating portion rotatably supported by the bearing mechanism. The cup portion includes a cylindrical portion arranged to be coaxial or substantially coaxial with a central axis extending in a vertical direction, and a bottom plate portion defined integrally with the cylindrical portion, and arranged to close a lower portion of the cylindrical portion. The base member further includes a communicating hole arranged to pass through the bottom plate portion in an axial direction. The method includes the steps of inserting a jig into the base member through the communicating hole from below, and causing at least a portion of the jig to pass through the communicating hole; applying a first adhesive to an inner circumferential surface of the cylindrical portion; inserting the bearing mechanism into the cup portion, and bringing at least a portion of the bearing mechanism into contact with at least a portion of the jig; removing the jig from the base member; and applying a second adhesive into the communicating hole.

According to each of the above preferred embodiments of the present invention, gas which is present between the bearing mechanism and the bottom plate portion is discharged out of the cup portion through the communicating hole when the bearing mechanism is inserted into the cup portion. This leads to a reduction in resistance when the bearing mechanism is inserted into the cup portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that the axial direction is a vertical direction, and that a side on which a bearing mechanism is arranged with respect to a bottom plate portion of a cup portion is an upper side, and the shape of each member or portion and relative positions of different members or portions will be described based on the above assumptions. Note, however, that the above definitions of the vertical direction and the upper and lower sides are simply made for the sake of convenience in description, and should not be construed to restrict the orientation of a spindle motor or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

1. First Preferred Embodiment

Figure 1:
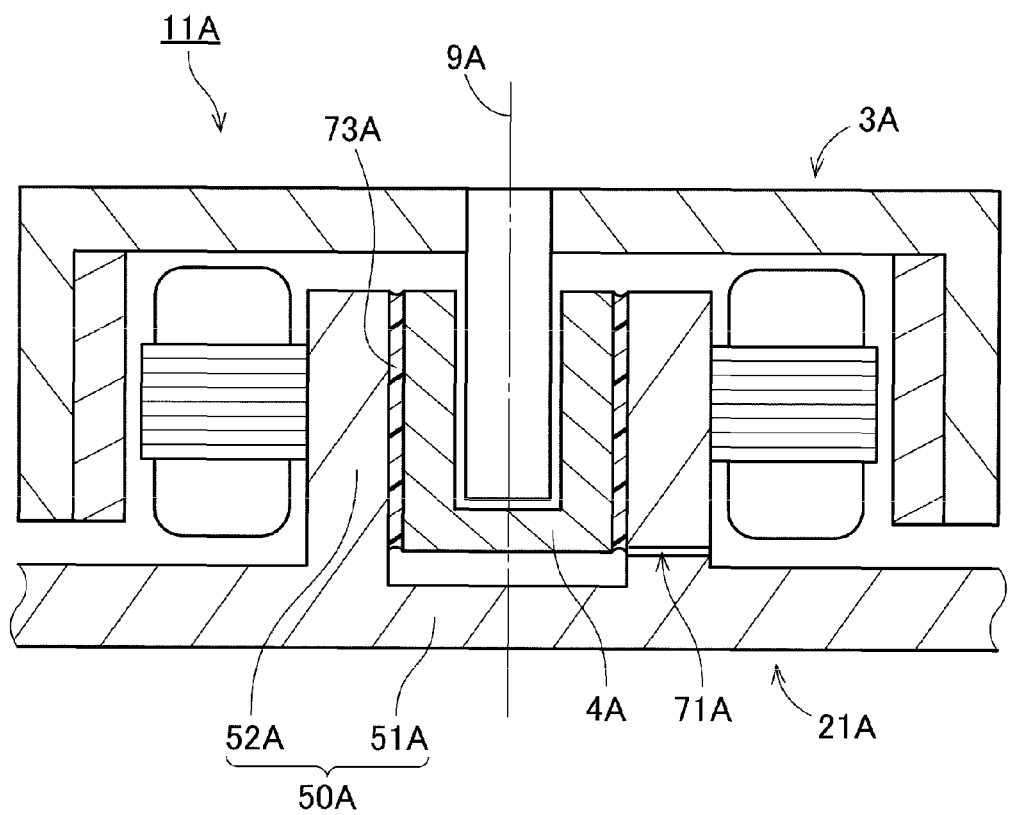
FIG. 1 is a vertical sectional view of a spindle motor according to a first preferred embodiment of the present invention.

FIG. 1 is a vertical sectional view of a spindle motor 11A according to a first preferred embodiment of the present invention. Referring to FIG. 1, the spindle motor 11A includes a base member 21A, a bearing mechanism 4A, and a rotating portion 3A. The bearing mechanism 4A is fixed to the base member 21A. The rotating portion 3A is rotatably supported by the bearing mechanism 4A.

The base member 21A includes a bottom plate portion 51A and a cylindrical portion 52A. The cylindrical portion 52A is arranged to be coaxial or substantially coaxial with a central axis 9A extending in the vertical direction. The bottom plate portion 51A is arranged to close a lower portion of the cylindrical portion 52A. The bottom plate portion 51A and the cylindrical portion 52A are defined integrally with each other to together define a cup portion 50A.

Figure 2:
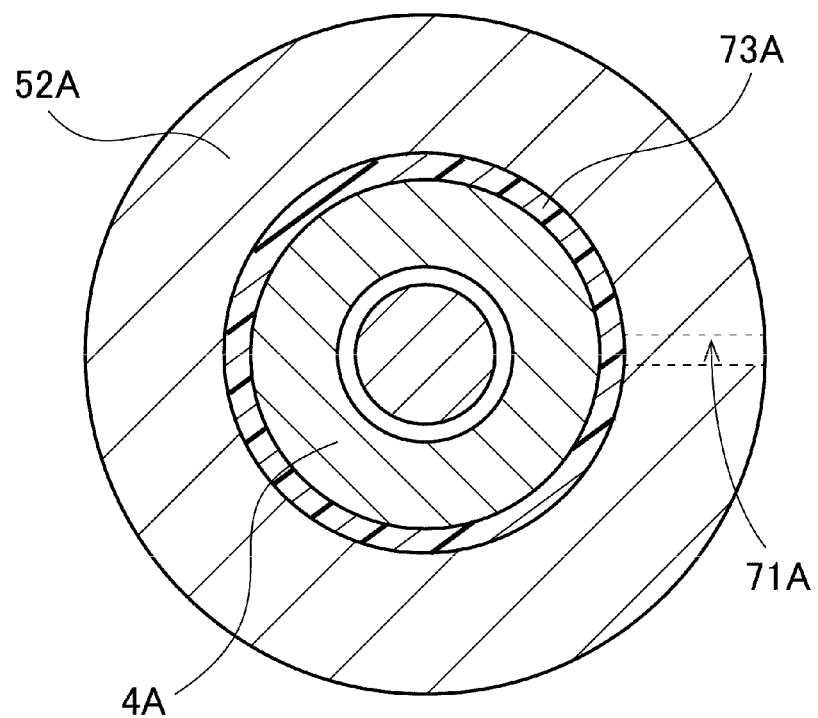
FIG. 2 is a horizontal sectional view of a cylindrical portion and a bearing mechanism according to the first preferred embodiment of the present invention.

FIG. 2 is a horizontal sectional view of the cylindrical portion 52A and the bearing mechanism 4A. Referring to FIGS. 1 and 2, the bearing mechanism 4A is arranged inside of the cup portion 50A. In addition, an adhesive layer 73A is arranged between an outer circumferential surface of the bearing mechanism 4A and an inner circumferential surface of the cylindrical portion 52A. The bearing mechanism 4A is thus fixed to the cylindrical portion 52A.

The cup portion 50A includes a first communicating hole 71A, which is not filled with the adhesive layer 73A, in the vicinity of a junction of the cylindrical portion 52A and the bottom plate portion 51A. The first communicating hole 71A is arranged to pass through the cylindrical portion 52A in a radial direction that crosses the axial direction.

When the spindle motor 11A is manufactured, the bearing mechanism 4A is inserted inside the cylindrical portion 52A of the cup portion 50A. At this time, gas which is present between the bearing mechanism 4A and the bottom plate portion 51A travels through the first communicating hole 71A to be discharged out of the cup portion 50A. This leads to a reduction in resistance when the bearing mechanism 4A is inserted into the cup portion 50A, and enables the bearing mechanism 4A to be smoothly inserted into the cup portion 50A.

At least a portion of an opening portion of the first communicating hole 71A defined in the inner circumferential surface of the cylindrical portion 52A is arranged below the bearing mechanism 4A. This arrangement contributes to preventing an adhesive in a gap between the cup portion 50A and the bearing mechanism 4A from entering into the first communicating hole 71A when the bearing mechanism 4A is inserted and the adhesive is pushed out downwardly.

Figure 4:
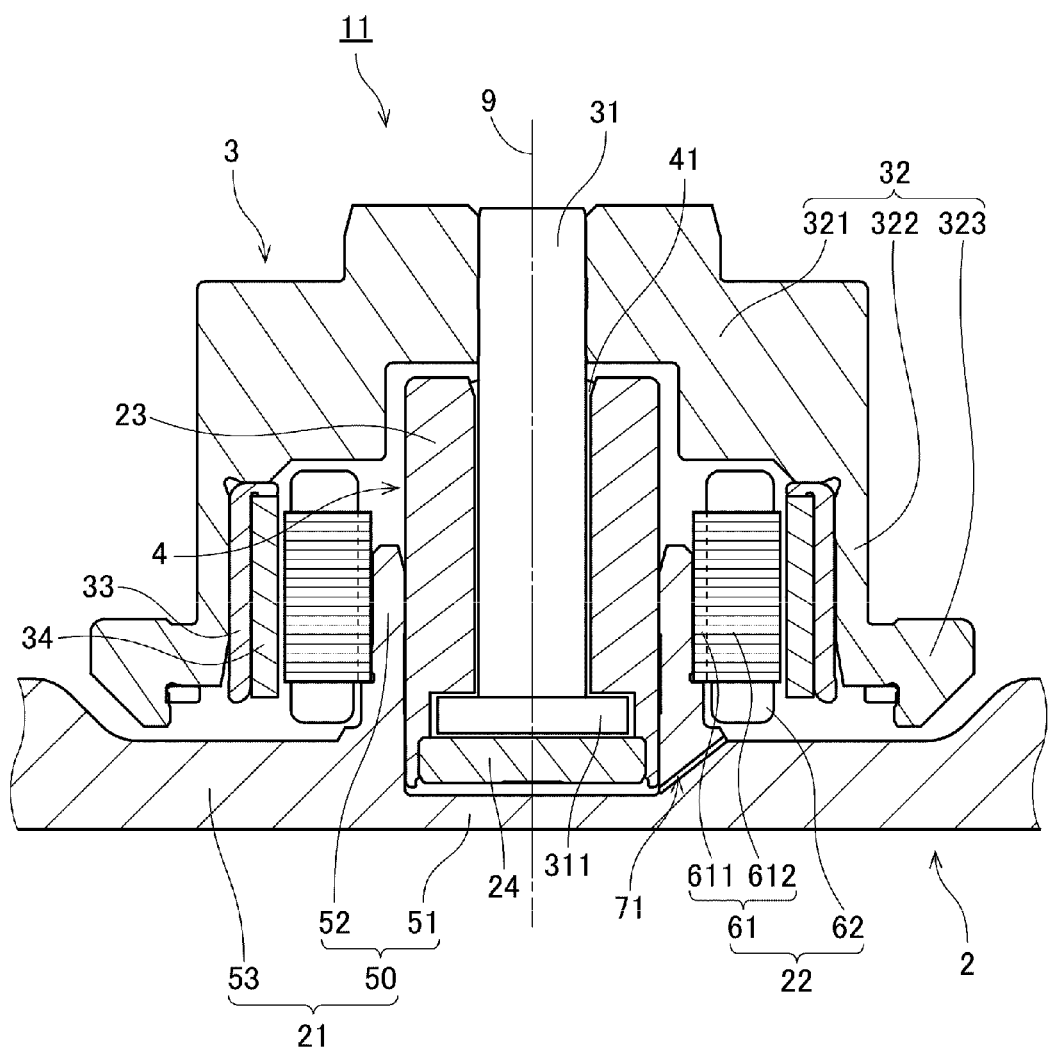
FIG. 4 is a vertical sectional view of a spindle motor according to the second preferred embodiment of the present invention.

The first communicating hole 71A may be arranged to extend from an inner side to an outer side of the cylindrical portion 52A at a constant height, i.e., at a constant axial position, as illustrated in FIG. 1, or may alternatively be arranged to extend obliquely such that the axial position of the first communicating hole 71A becomes higher as the first communicating hole 71A extends from the inner side toward the outer side of the cylindrical portion 52A (see FIG. 4). In the case where the first communicating hole 71A is arranged to extend at a constant height, the length of the first communicating hole 71A can be minimized, resulting in reduced channel resistance. Meanwhile, in the case where the first communicating hole 71A is arranged to extend obliquely such that the axial position of the first communicating hole 71A becomes higher as the first communicating hole 71A extends from the inner side toward the outer side of the cylindrical portion 52A, a portion of the base member 21A which is radially outside of the cylindrical portion 52A can be arranged to have a thickness greater than that of the bottom plate portion 51A. This allows the first communicating hole 71A to be defined while maintaining rigidity of the base member 21A.

Each of the opening portion of the first communicating hole 71A defined in the inner circumferential surface of the cylindrical portion 52A, and an opening portion of the first communicating hole 71A defined in an outer circumferential surface of the cylindrical portion 52A, may be circular, elliptical, square, rectangular, in the shape of a polygon other than a square or rectangle, or in any other desirable shape. In the case where the opening portion is circular, the size of the hole defined in the cup portion 50A can be minimized, allowing rigidity of the cup portion 50A to be maintained.

2. Second Preferred Embodiment 2-1. Structure of Disk Drive Apparatus

Figure 3:
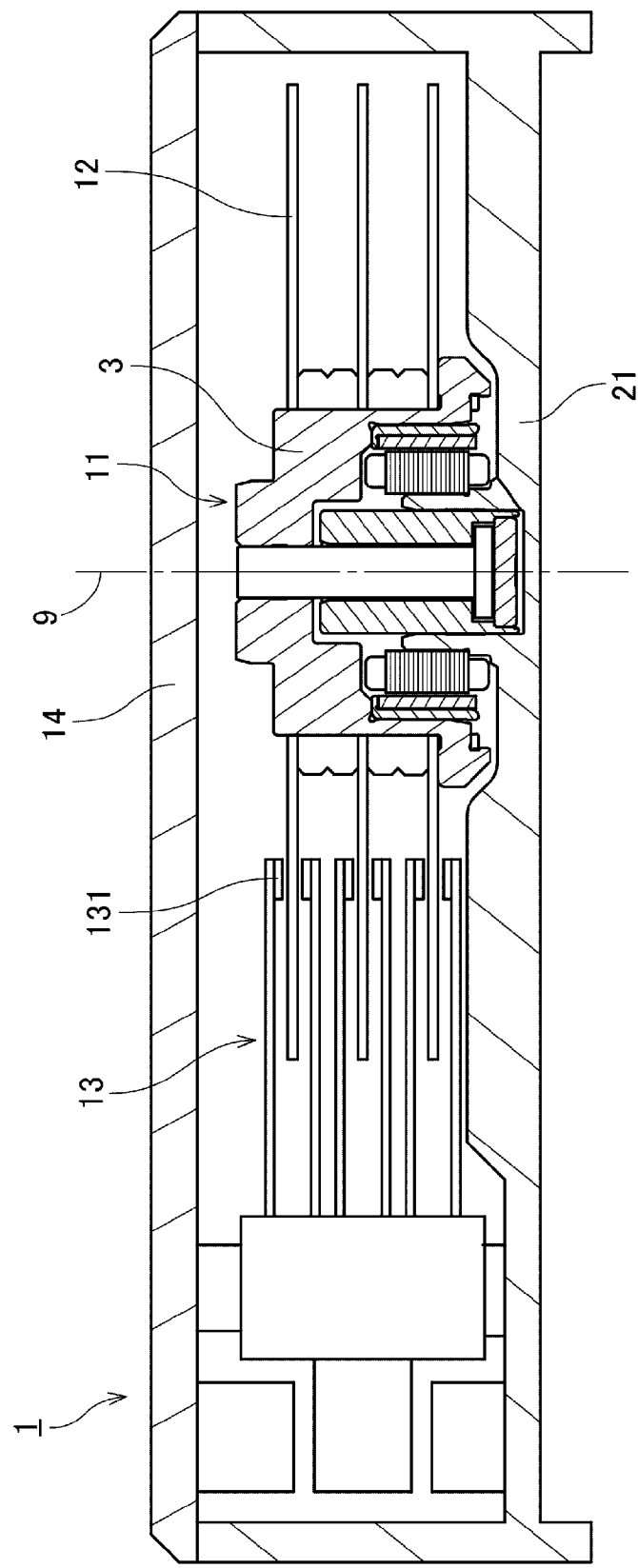
FIG. 3 is a vertical sectional view of a disk drive apparatus according to a second preferred embodiment of the present invention.

FIG. 3 is a vertical sectional view of a disk drive apparatus 1 according to a second preferred embodiment of the present invention. The disk drive apparatus 1 is an apparatus arranged to perform reading and writing of information from or to magnetic disks 12 while rotating the magnetic disks 12. As illustrated in FIG. 3, the disk drive apparatus 1 includes a spindle motor 11, the magnetic disks 12, which are three in number, an access portion 13, and a cover 14.

The spindle motor 11 is arranged to rotate the three magnetic disks 12 about a central axis 9 while supporting the magnetic disks 12. The spindle motor 11 includes a base member 21 arranged to extend radially on a lower side of the magnetic disks 12. A rotating portion 3 of the spindle motor 11, the three magnetic disks 12, and the access portion 13 are housed in a case defined by the base member 21 and the cover 14. The access portion 13 is arranged to move heads 131 along recording surfaces of the magnetic disks 12 to perform the reading and the writing of information from or to the magnetic disks 12.

A junction of the base member 21 and the cover 14 is sealed by a sealant, such as, for example, an elastomer. An interior space of the case is thus kept airtight. The interior of the case is filled with a clean air containing few particles. Note that the interior of the case may be filled with helium, hydrogen, a gas mixture of helium and hydrogen, or a gas mixture of any one of the above and air, instead of the air. This leads to a reduction in resistance of gas against the access portion 13.

Note that the disk drive apparatus 1 may alternatively be arranged to include one, two, or more than three magnetic disks 12. Also note that the access portion 13 may alternatively be arranged to perform only one of the reading and the writing of information from or to the magnetic disk(s) 12.

2-2. Structure of Spindle Motor

Next, the structure of the above-described spindle motor 11 will now be described below. FIG. 4 is a vertical sectional view of the spindle motor 11. Referring to FIG. 4, the spindle motor 11 includes a stationary portion 2 and the rotating portion 3. The stationary portion 2 is arranged to be stationary relative to both the base member 21 and the cover 14. The rotating portion 3 is supported to be rotatable with respect to the stationary portion 2.

The stationary portion 2 according to the present preferred embodiment includes the base member 21, an armature 22, a sleeve 23, and a cap 24.

The base member 21 is arranged to support both the armature 22 and the sleeve 23. The base member 21 is a metal member, and is obtained, for example, by casting. The base member 21 is made of, for example, a metal material, such as an aluminum alloy. Referring to FIG. 4, the base member 21 includes an inner bottom plate portion 51, a cylindrical portion 52, and an outer bottom plate portion 53.

The inner bottom plate portion 51, the cylindrical portion 52, and the outer bottom plate portion 53 are defined integrally with one another.

The inner bottom plate portion 51 is arranged to extend perpendicularly to the central axis 9 on a lower side of the sleeve 23 and the cap 24 to substantially assume the shape of a disk. The cylindrical portion 52 is arranged to extend upward from a radially outer edge portion of the inner bottom plate portion 51 to substantially assume the shape of a cylinder. In addition, the cylindrical portion 52 is arranged to be coaxial or substantially coaxial with the central axis 9. The inner bottom plate portion 51 is arranged to close a lower portion of the cylindrical portion 52. That is, the inner bottom plate portion 51 and the cylindrical portion 52 are arranged to together define a cup portion 50 having a bottom and being substantially cylindrical. The outer bottom plate portion 53 is arranged to extend further radially outward from the radially outer edge portion of the inner bottom plate portion 51.

The armature 22 includes a stator core 61 and a plurality of coils 62. The stator core 61 is defined, for example, by laminated steel sheets. The laminated steel sheets are preferably a collection of electromagnetic steel sheets placed one upon another in the axial direction. A silicon steel sheet or the like, for example, is used as each of the electromagnetic steel sheets. The stator core 61 includes an annular core back 611 and a plurality of teeth 612 arranged to project radially outward from the core back 611. The core back 611 is fixed to an outer circumferential surface of the cylindrical portion 52. The teeth 612 are arranged at substantially regular intervals in the circumferential direction. Each of the coils 62 is defined by a conducting wire wound around a separate one of the teeth 612.

The sleeve 23 is arranged to extend in the axial direction to assume a substantially cylindrical shape around a shaft 31, which will be described below. A lower portion of the sleeve 23 is arranged inside of the cup portion 50. That is, the sleeve 23 is arranged radially inside of the cylindrical portion 52 and above the inner bottom plate portion 51. An outer circumferential surface of the sleeve 23 is fixed to an inner circumferential surface of the cylindrical portion 52 through an adhesive layer 73, which will be described below. An inner circumferential surface of the sleeve 23 is arranged radially opposite to an outer circumferential surface of the shaft 31. In addition, a lower opening of the sleeve 23 is closed by the cap 24.

The rotating portion 3 according to the present preferred embodiment includes the shaft 31, a hub 32, a back yoke 33, and a magnet 34.

The shaft 31 is arranged to extend in the axial direction radially inside of the sleeve 23. A metal, such as stainless steel, for example, is used as a material of the shaft 31. An upper end portion of the shaft 31 is arranged to project upward above an upper surface of the sleeve 23. In addition, the shaft 31 includes a plate portion 311 arranged to project radially outward from a lower end portion thereof. An upper surface of the plate portion 311 is arranged axially opposite to the sleeve 23. Upward coming off of the shaft 31 is thus prevented.

A lubricating fluid 41 is arranged between the shaft 31 and a combination of the sleeve 23 and the cap 24. A surface of the lubricating fluid 41 is defined between the inner circumferential surface of the sleeve 23 and the outer circumferential surface of the shaft 31. The shaft 31 is supported through the lubricating fluid 41 to be rotatable with respect to the sleeve 23 and the cap 24. That is, in the present preferred embodiment, a bearing mechanism 4 is defined by the combination of the sleeve 23 and the cap 24, both of which belong to the stationary portion 2, the shaft 31, which belongs to the rotating portion 3, and the lubricating fluid 41 arranged therebetween. A polyolester oil or a diester oil, for example, is used as the lubricating fluid 41.

The hub 32 includes a top plate portion 321, an annular wall portion 322, and a flange portion 323. The top plate portion 321 is arranged to cover an upper side of the armature 22 and the sleeve 23. An inner circumferential surface of the top plate portion 321 is fixed to the upper end portion of the shaft 31. The annular wall portion 322 is arranged to extend downward from a radially outer edge portion of the top plate portion 321 to substantially assume the shape of a cylinder. The flange portion 323 is arranged to project radially outward from a lower end portion of the annular wall portion 322.

The hub 32 is arranged to support the three magnetic disks 12. At least a portion of an inner circumferential portion of each magnetic disk 12 is arranged to be in contact with an outer circumferential surface of the annular wall portion 322. Each magnetic disk 12 is thus radially positioned. In addition, at least a portion of a lower surface of a lowermost one of the magnetic disks 12 is arranged to be in contact with an upper surface of the flange portion 323. The lowermost magnetic disk 12 is thus axially positioned.

The back yoke 33 is an annular member made of a magnetic material. The back yoke 33 is fixed to each of a lower surface of the top plate portion 321 and an inner circumferential surface of the annular wall portion 322 through, for example, an adhesive layer. In addition, the magnet 34, which is annular in shape, is fixed to an inner circumferential surface of the back yoke 33 through, for example, an adhesive layer. An inner circumferential surface of the magnet 34 is arranged radially opposite to a radially outer end surface of each of the teeth 612. In addition, the inner circumferential surface of the magnet 34 includes north and south poles arranged to alternate with each other in the circumferential direction.

Note that, in place of the annular magnet 34, a plurality of magnets may be used. In the case where the plurality of magnets are used, the magnets are arranged in the circumferential direction such that north and south poles alternate with each other.

Once electric drive currents are supplied to the coils 62 in the spindle motor 11 as described above, radial magnetic flux is generated around each of the teeth 612 of the stator core 61. Then, interaction between the magnetic flux of the teeth 612 and magnetic flux of the magnet 34 produces a circumferential torque, so that the rotating portion 3 is caused to rotate about the central axis 9 with respect to the stationary portion 2. The magnetic disks 12 supported by the hub 32 are caused to rotate about the central axis 9 together with the rotating portion 3.

Figure 5:
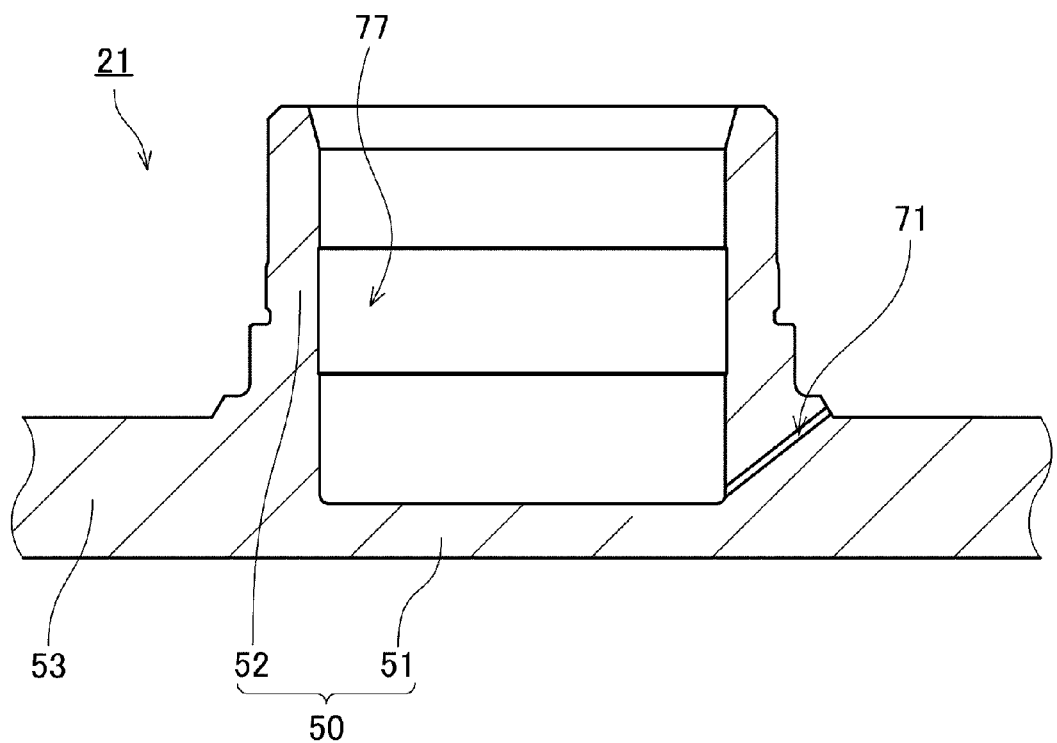
FIG. 5 is a partial vertical sectional view of a base member according to the second preferred embodiment of the present invention.
Figure 6:
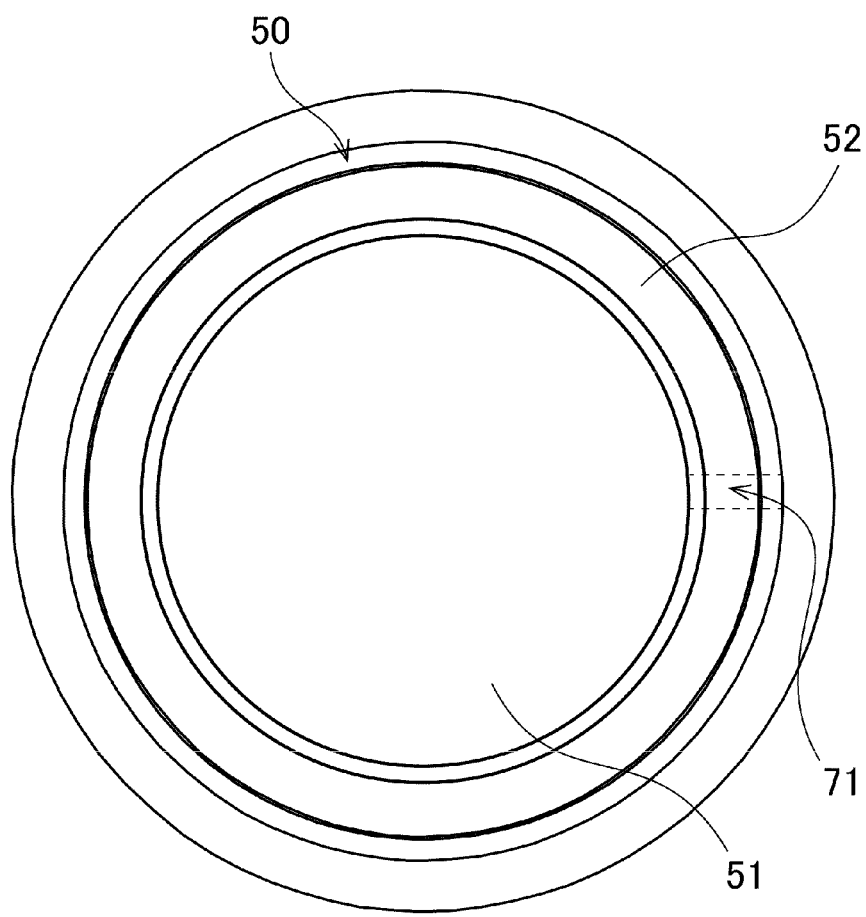
FIG. 6 is a partial top view of the base member according to the second preferred embodiment of the present invention.

2-3. Structure by Which Base Member and Bearing Mechanism are Fixed to Each Other Next, a structure by which the base member 21 and the bearing mechanism 4 are fixed to each other will now be described in more detail below. FIG. 5 is a partial vertical sectional view of the base member 21. FIG. 6 is a partial top view of the base member 21. As described above, the base member 21 includes the cup portion 50 having the bottom and being substantially cylindrical and which is defined by the inner bottom plate portion 51 and the cylindrical portion 52.

Referring to FIGS. 5 and 6, the base member 21 includes a first communicating hole 71, which is not filled with an adhesive, in the vicinity of a junction of the cylindrical portion 52 and the inner bottom plate portion 51. The first communicating hole 71 is arranged to extend from the inner circumferential surface to the outer circumferential surface of the cylindrical portion 52. In addition, the first communicating hole 71 is arranged to pass through the cylindrical portion 52 in a direction that crosses the axial direction. The first communicating hole 71 may be arranged to extend from an inner side to an outer side of the cylindrical portion 52 at a constant height, i.e., at a constant axial position, or may alternatively be arranged to extend obliquely such that the axial position of the first communicating hole 71 becomes higher as the first communicating hole 71 extends from the inner side toward the outer side of the cylindrical portion 52. Note that the number of first communicating holes 71 may be either one or more than one. The first communicating hole 71 is defined by, for example, inserting a columnar drill into the base member 21.

Figure 7:
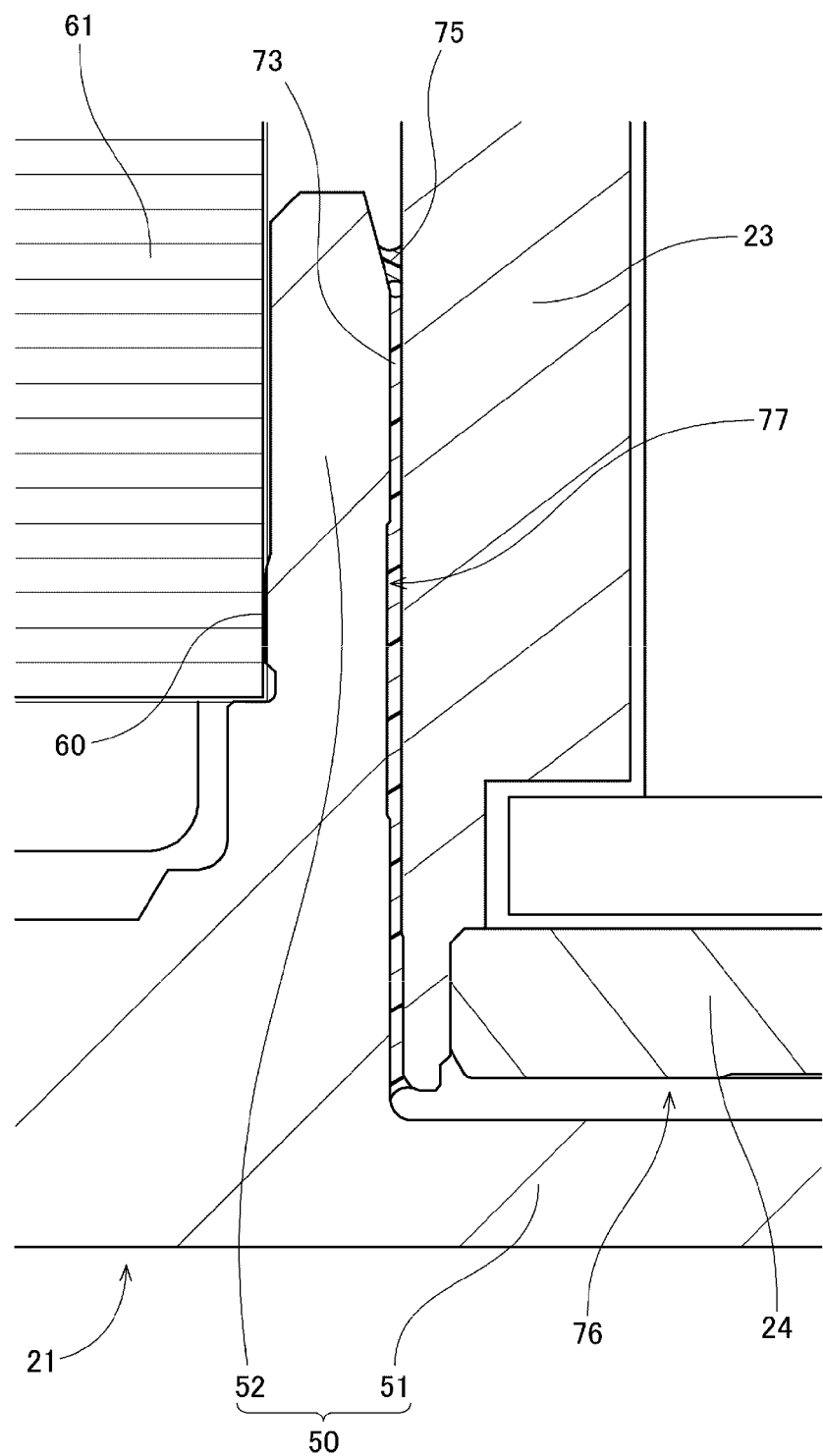
FIG. 7 is a partial vertical sectional view of the spindle motor according to the second preferred embodiment of the present invention.

FIG. 7 is a partial vertical sectional view of the spindle motor 11. Referring to FIG. 7, the adhesive layer 73 is arranged between the outer circumferential surface of the sleeve 23 and the inner circumferential surface of the cylindrical portion 52. The cylindrical portion 52 and the sleeve 23 are thus fixed to each other. An epoxy resin adhesive, for example, is used as an adhesive that defines the adhesive layer 73.

Moreover, an electrically conductive adhesive 75, which is different in type from the adhesive of the adhesive layer 73, is arranged between the outer circumferential surface of the sleeve 23 and an inner circumferential surface of a portion of the cylindrical portion 52 which is in the vicinity of an upper end portion of the cylindrical portion 52. An electric charge generated in the rotating portion 3 flows to the base member 21 through the lubricating fluid 41, the sleeve 23, and the electrically conductive adhesive 75. The rotating portion 3 is thus prevented from being electrified. Note that the electrically conductive adhesive 75 may alternatively be arranged between the outer circumferential surface of the sleeve 23 and an inner circumferential surface of a portion of the cylindrical portion 52 which is in the vicinity of a lower end portion of the cylindrical portion 52.

Further, a combination of a lower end portion of the sleeve 23 and a lower surface of the cap 24, that is, a lower end portion of the bearing mechanism 4, is arranged axially opposite to an upper surface of the inner bottom plate portion 51 with a gap 76 therebetween. When the spindle motor 11 is manufactured, the axial position of each of the sleeve 23 and the cap 24 is determined without being restricted by the inner bottom plate portion 51. Each of the sleeve 23 and the cap 24 is thus positioned accurately in the axial direction.

Furthermore, as illustrated in FIG. 7, the base member 21 according to the present preferred embodiment includes, in the inner circumferential surface of the cylindrical portion 52, an inner circumferential groove 77 arranged to extend in the circumferential direction. The radial distance between the outer circumferential surface of the sleeve 23 and a curved surface which defines the inner circumferential groove 77 is greater than the radial distance between the outer circumferential surface of the sleeve 23 and a remaining portion of the inner circumferential surface of the cylindrical portion 52, excluding the inner circumferential groove 77. In addition, the inner circumferential groove 77 and an area 60 of contact between the cylindrical portion 52 and the stator core 61 are arranged to overlap with each other in the radial direction. This makes it more unlikely for a radially inward stress which the cylindrical portion 52 receives through the contact area 60 to be transmitted to the sleeve 23. This reduces the likelihood of distortion of the sleeve 23.

Figure 8:
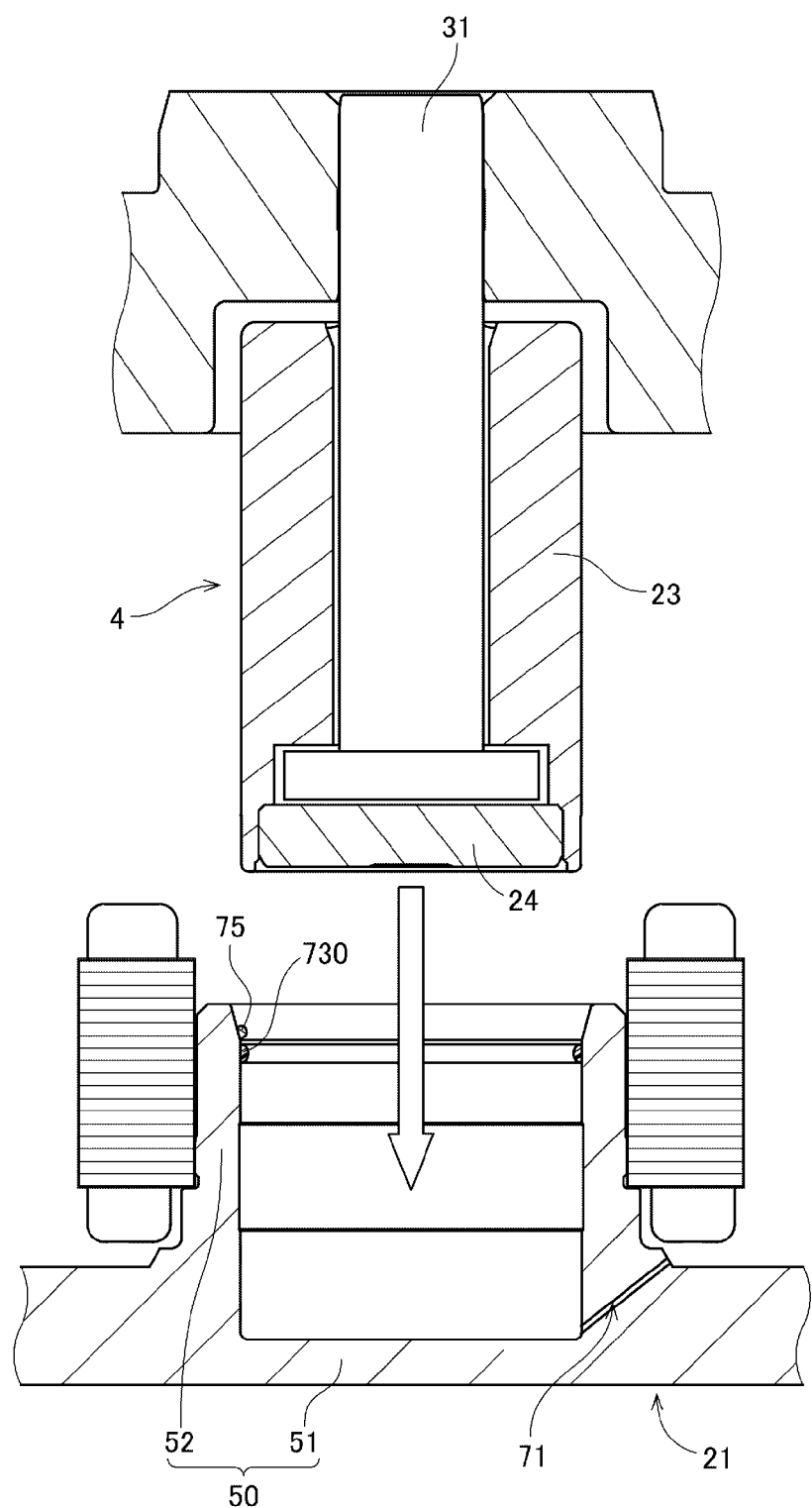
FIG. 8 is a diagram illustrating a manner in which the spindle motor according to the second preferred embodiment is manufactured.

FIG. 8 is a vertical sectional view illustrating a manner in which the bearing mechanism 4 is fitted to the cup portion 50 of the base member 21. In the example of FIG. 8, an adhesive 730 and the electrically conductive adhesive 75 are first applied to the inner circumferential surface of the cylindrical portion 52. The electrically conductive adhesive 75 is applied to the inner circumferential surface of the portion of the cylindrical portion 52 which is in the vicinity of the upper end portion of the cylindrical portion 52. The adhesive 730 is applied to a position below the electrically conductive adhesive 75 such that the adhesive 730 is arranged to extend in the shape of a circular arc in the circumferential direction. Thereafter, the bearing mechanism 4 is inserted into the cup portion 50 from above the cup portion 50 as indicated by a white arrow in FIG. 8. As a result, each of the adhesive 730 and the electrically conductive adhesive 75 is arranged between the inner circumferential surface of the cylindrical portion 52 and the outer circumferential surface of the sleeve 23, that is, between the inner circumferential surface of the cylindrical portion 52 and an outer circumferential surface of the bearing mechanism 4. In addition, the insertion of the bearing mechanism 4 causes the adhesive 730 to spread downward. Then, the adhesive 730 is cured between the sleeve 23 and the cylindrical portion 52 to define the adhesive layer 73.

When the bearing mechanism 4 is inserted into the cup portion 50, gas which is present between the lower end portion of the bearing mechanism 4 and the upper surface of the inner bottom plate portion 51 is discharged out of the cup portion 50 through the first communicating hole 71. Thus, a rise in atmospheric pressure in a space between the lower end portion of the bearing mechanism 4 and the upper surface of the inner bottom plate portion 51 is minimized. This leads to a reduction in resistance when the bearing mechanism 4 is inserted into the cup portion 50, and enables the bearing mechanism 4 to be smoothly inserted into the cup portion 50.

In particular, at least a portion of an opening portion of the first communicating hole 71 defined in the inner circumferential surface of the cylindrical portion 52 is arranged below the bearing mechanism 4. That is, this opening portion of the first communicating hole 71 is defined at such an axial position that the opening portion faces on the gap 76 between the bearing mechanism 4 and the inner bottom plate portion 51 after the bearing mechanism 4 is inserted into the cup portion 50. Therefore, even if the adhesive layer 73 is spread up to the vicinity of the lower end portion of the cylindrical portion 52 at the time of the insertion of the bearing mechanism 4, it is unlikely that the opening portion of the first communicating hole 71 will be completely sealed with the adhesive layer 73. Therefore, the gas which is present between the bearing mechanism 4 and the inner bottom plate portion 51 can be discharged more securely.

Moreover, even after the spindle motor 11 is manufactured, the gap 76 between the bearing mechanism 4 and the inner bottom plate portion 51 is in communication with an outside of the cup portion 50 through the first communicating hole 71. Therefore, a change in ambient temperature would not easily cause a change in pressure in the gap 76. Therefore, neither the sleeve 23 nor the cap 24 tends to easily get distorted due to a pressure.

Furthermore, as illustrated in FIG. 8, the electrically conductive adhesive 75 is applied to a position, on the inner circumferential surface of the cylindrical portion 52, which does not overlap with the first communicating hole 71. This arrangement makes it unlikely for the electrically conductive adhesive 75 to enter into the first communicating hole 71. In particular, in the present preferred embodiment, the electrically conductive adhesive 75 is arranged at a circumferential position opposite to that of the first communicating hole 71 in a plan view. This arrangement further reduces the likelihood that the electrically conductive adhesive 75 will enter into the first communicating hole 71.

In addition, in the present preferred embodiment, each of a wall surface of the first communicating hole 71 and a surface of the base member 21 is coated with an electrodeposition coating film. Meanwhile, a metal surface of the aluminum alloy is exposed on the inner circumferential surface of the cylindrical portion 52. To this metal surface, the adhesive layer 73 is adhered more easily than to a surface of the electrodeposition coating film. This makes it easier for the adhesive layer 73 to be held between the inner circumferential surface of the cylindrical portion 52 and the outer circumferential surface of the sleeve 23. This contributes to more secure adhesion between the cylindrical portion 52 and the sleeve 23.

Note that it is preferable that, when the base member 21 is manufactured, electrodeposition coating is first applied to the entire surface of the base member 21, for example, and thereafter the inner circumferential surface of the cylindrical portion 52 is subjected to a cutting process. This method allows the metal surface to be exposed on the inner circumferential surface of the cylindrical portion 52 while leaving the electrodeposition coating film on the wall surface of the first communicating hole 71 and the remaining surface of the base member 21.

2-4. Modification of Second Preferred Embodiment

Figure 9:
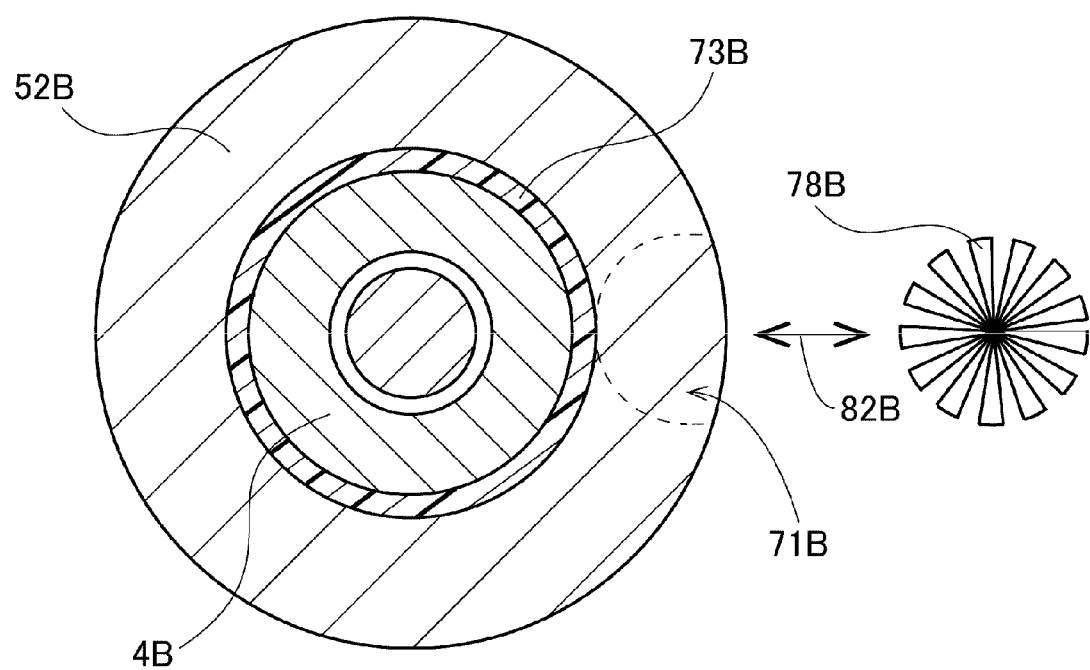
FIG. 9 is a diagram illustrating a manner in which a communicating hole according to a modification of the second preferred embodiment is bored.

FIG. 9 is a top view illustrating a manner in which a first communicating hole 71B according to a modification of the second preferred embodiment is bored. As illustrated in FIG. 9, a cutting tool 78B including a circular blade may be brought closer to a cylindrical portion 52B in a radial direction (i.e., a boring direction 82B) while being rotated to bore the first communicating hole 71B. In this case, in a cross-section perpendicular to the axial direction, both circumferential edges of the first communicating hole 71B will each be in the shape of a circular arc. In addition, an increase in an opening area of the first communicating hole 71B can be achieved, leading to reduced channel resistance for gas in the first communicating hole 71B. This leads to an additional reduction in resistance when a bearing mechanism 4B is inserted into a cup portion.

3. Third Preferred Embodiment

Figure 10:
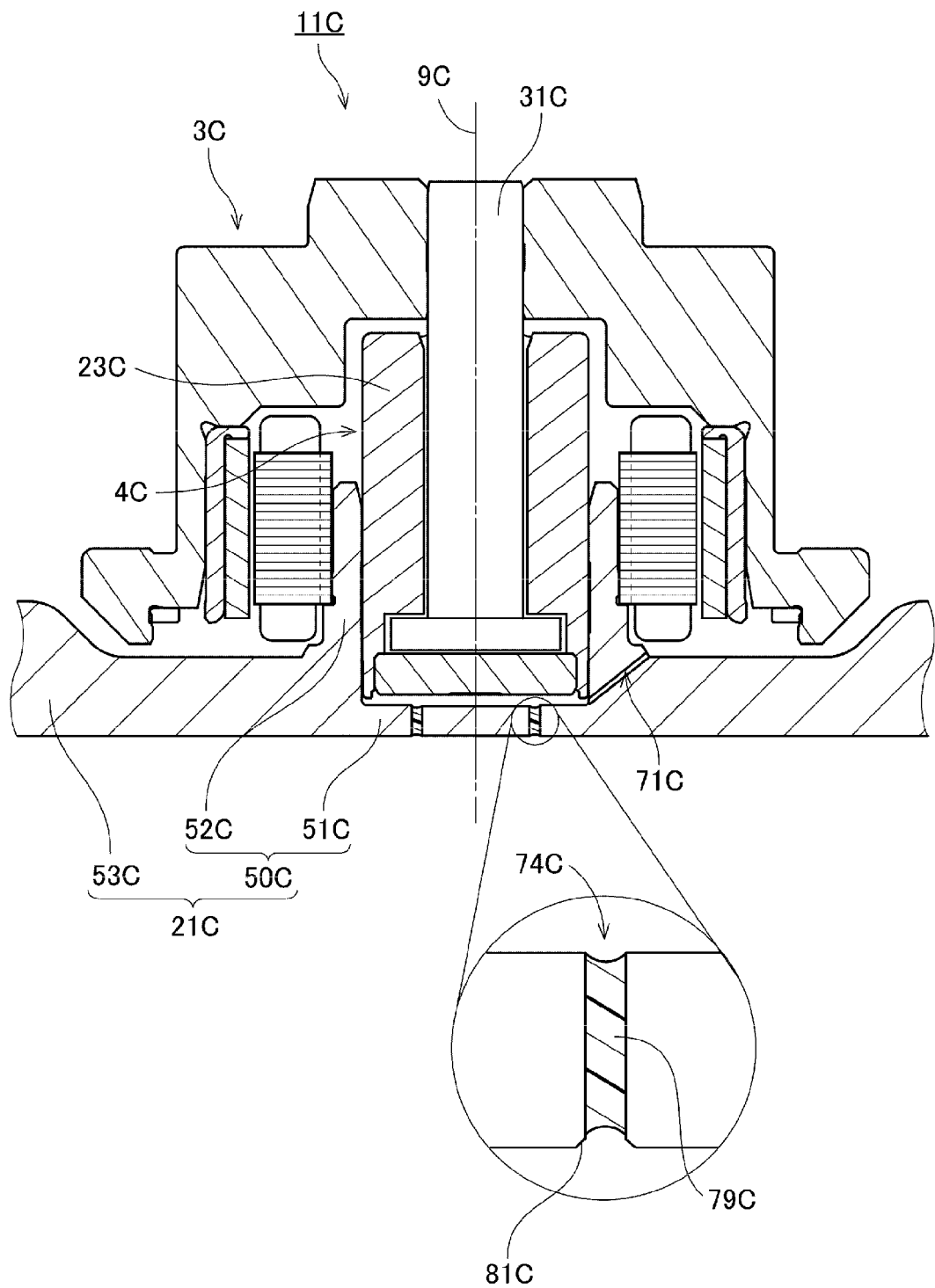
FIG. 10 is a vertical sectional view of a spindle motor according to a third preferred embodiment of the present invention.

FIG. 10 is a vertical sectional view of a spindle motor 11C according to a third preferred embodiment of the present invention. The spindle motor 11C according to the third preferred embodiment will now be described below with focus on differences from the spindle motor 11 according to the second preferred embodiment. Redundant descriptions of features of the third preferred embodiment which are shared by the second preferred embodiment will be omitted. The spindle motor 11C according to the present preferred embodiment is different from the spindle motor 11 according to the second preferred embodiment in that an inner bottom plate portion 51C of a base member 21C further includes two second communicating holes 74C each of which is arranged to pass through the inner bottom plate portion 51C in the axial direction.

The second communicating holes 74C may be provided either in addition to a first communicating hole 71C or in place of the first communicating hole 71C. When a bearing mechanism 4C is inserted inside a cylindrical portion 52C of a cup portion 50C, gas which is present between the bearing mechanism 4C and the inner bottom plate portion 51C can be discharged out of the cup portion 50C through the second communicating holes 74C as well as through the first communicating hole 71C. This leads to a reduction in resistance when the bearing mechanism 4C is inserted into the cup portion 50C, and enables the bearing mechanism 4C to be smoothly inserted into the cup portion 50C.

Figure 11:
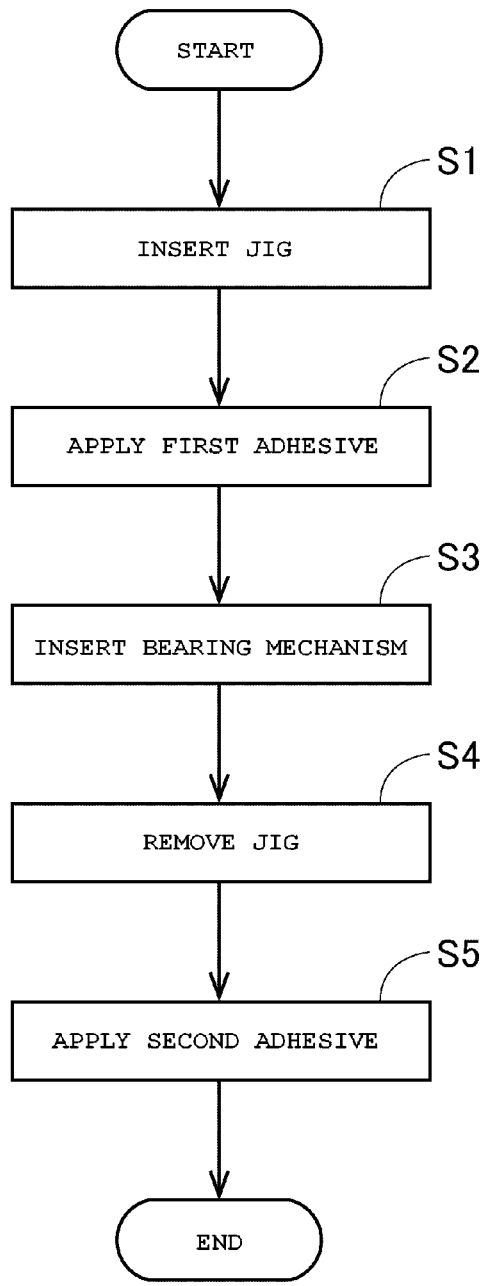
FIG. 11 is a flowchart illustrating a portion of a process of manufacturing the spindle motor according to the third preferred embodiment of the present invention.
Figure 12:
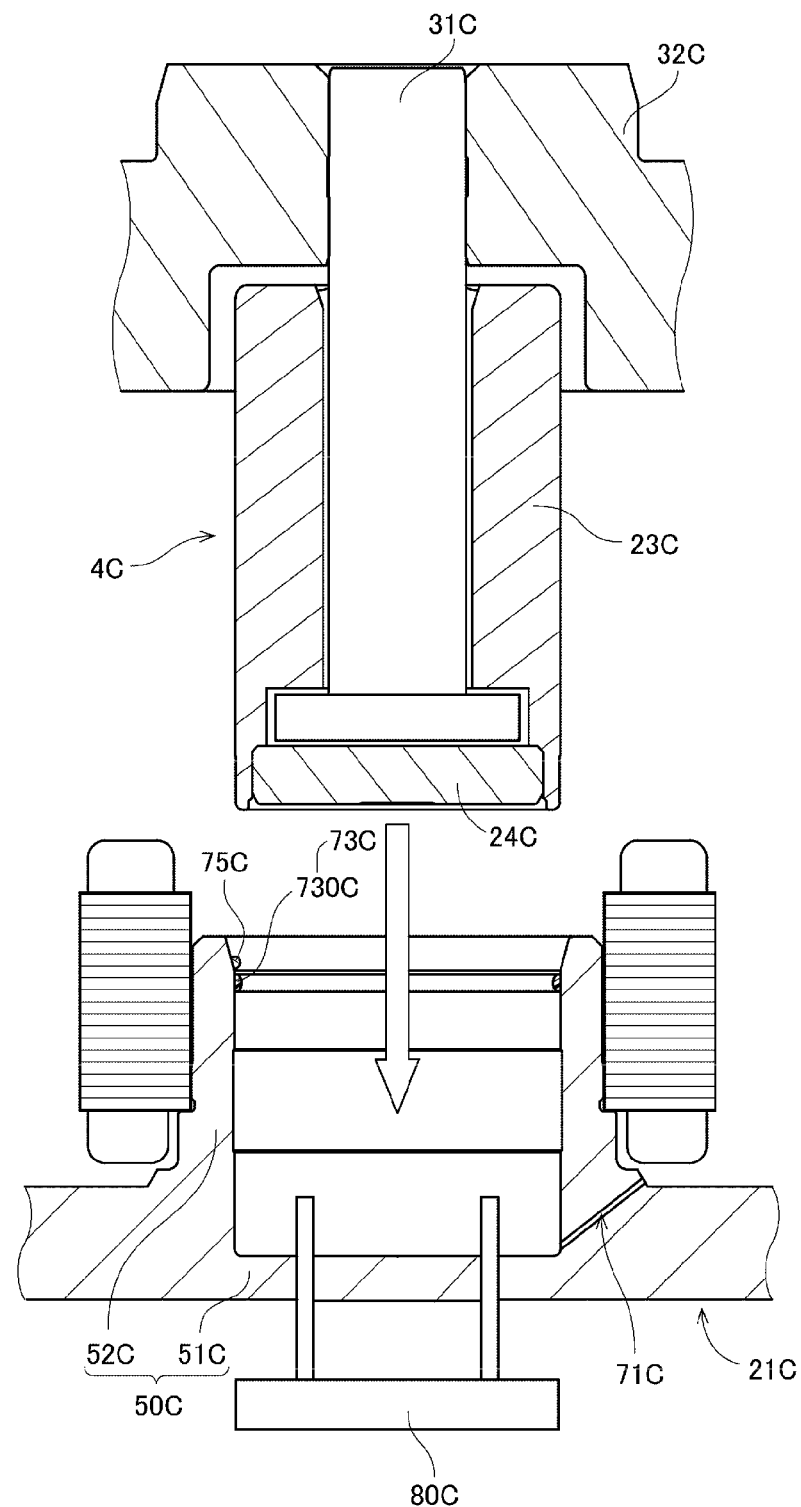
FIG. 12 is a diagram illustrating a manner in which the spindle motor according to the third preferred embodiment is manufactured.

FIG. 11 is a flowchart illustrating a portion of a process of manufacturing the spindle motor 11C. FIG. 12 is a diagram illustrating a manner in which the spindle motor 11C is manufactured. As illustrated in FIGS. 11 and 12, when the spindle motor 11C is manufactured, the bearing mechanism 4C with a shaft 31C and a hub 32C attached thereto is inserted into the cup portion 50C in a direction indicated by a white arrow in FIG. 12. In addition, in a previous step, a jig 80C is inserted from below into the base member 21C through the second communicating holes 74C in advance. At least a portion of the jig 80C is passed through each second communicating hole 74C to reach a space inside of the cylindrical portion 52C. Then, a lower end of the bearing mechanism 4C with the shaft 31C and the hub 32C attached thereto is brought into contact with an upper end of the jig 80C. In this situation, the height of the hub 32C is adjusted while a lower surface of the shaft 31C and a cap 24C are pressed against each other. The bearing mechanism 4C can thus be positioned accurately.

Note that each second communicating hole 74C is preferably arranged radially outward of the shaft 31C, which is rotatably supported by the bearing mechanism 4C. The bearing mechanism 4C can be stably supported by the jig 80C when the second communicating holes 74C are arranged radially outward. Accordingly, the height of the hub 32 can be adjusted with increased efficiency.

With reference to FIG. 11, a procedure for inserting the bearing mechanism 4C into the cup portion 50C will now be described again. As described above, the jig 80C is first inserted from below into the base member 21C through the second communicating holes 74C (step S1). At least a portion of the jig 80C is thus passed through each second communicating hole 74C to be placed inside of the cylindrical portion 52C. Next, a first adhesive 730C is applied to an inner circumferential surface of the cylindrical portion 52C (step S2). Next, the bearing mechanism 4C with the shaft 31C and the hub 32C attached thereto is inserted into the cup portion 50C (step S3). Then, the lower end of the bearing mechanism 4C is brought into contact with the upper end of the jig 80C. In this situation, the height of the hub 32C is adjusted while the lower surface of the shaft 31C and the cap 24C are pressed against each other. In addition, the bearing mechanism 4C is positioned accurately. The first adhesive 730C is cured between a sleeve 23C and the cylindrical portion 52C to define a first adhesive layer 73C. After the adjustment of the height of the hub 32C and the positioning of the bearing mechanism 4C are finished, or after the bearing mechanism 4C is fixed through the first adhesive layer 73C, the jig 80C is removed from the base member 21C (step S4). Thereafter, a second adhesive is applied into each second communicating hole 74C (step S5). The second adhesive is cured in the second communicating hole 74C to define a second adhesive layer 79C as illustrated in FIG. 10. The second communicating hole 74C is thus sealed therewith.

As illustrated in an enlarged view in FIG. 10, the base member 21C preferably includes a tapered surface 81C which increases in diameter with decreasing height at a lower end of each second communicating hole 74C. This allows the second adhesive layer 79C to be easily held at an opening portion of the second communicating hole 74C at the lower end thereof. Moreover, the insertion of the jig 80C into the second communicating holes 74C is made easier.

In the present preferred embodiment, each of a wall surface of each second communicating hole 74C and a surface of the base member 21C is coated with an electrodeposition coating film. Meanwhile, a metal surface of an aluminum alloy is exposed on the inner circumferential surface of the cylindrical portion 52C. To this metal surface, the first adhesive layer 73C is adhered more easily than to a surface of the electrodeposition coating film. This makes it easier for the first adhesive layer 73C to be held between the inner circumferential surface of the cylindrical portion 52C and an outer circumferential surface of the sleeve 23C. This contributes to more secure adhesion between the cylindrical portion 52C and the sleeve 23C.

4. Modifications

While preferred embodiments of the present invention have been described above, it is to be understood that the present invention is not limited to the above-described preferred embodiments.

Note that the adhesive that defines the adhesive layer is not limited to the epoxy resin adhesive, but may alternatively be, for example, an acrylic resin adhesive or the like. Note, however, that the adhesive that defines the adhesive layer is preferably an adhesive which has at least one property among a thermosetting property, an anaerobic setting property, and a UV-curing property.

Also note that the sleeve included in the bearing mechanism may not necessarily be defined by a single member, but may alternatively be defined by a plurality of members. For example, the sleeve may be defined by two members, a sleeve housing and a sleeve body arranged inside of the sleeve housing. In this case, the outer circumferential surface of the bearing mechanism refers to an outer circumferential surface of the sleeve housing. Also note that the sleeve may alternatively be defined by three or more members.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to spindle motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spindle motor comprising:
   a base member;
   a bearing mechanism fixed to the base member; and
   a rotating portion rotatably supported by the bearing mechanism; wherein
   the base member includes a cup portion including:

a cylindrical portion arranged to be coaxial or substantially coaxial with a central axis extending in a vertical direction; and a bottom plate portion defined integrally with the cylindrical portion, and arranged to close a lower portion of the cylindrical portion;

the bearing mechanism is arranged inside of the cup portion;

an outer circumferential surface of the bearing mechanism and an inner circumferential surface of the cylindrical portion have an adhesive layer arranged therebetween; and the cup portion includes at least one communicating hole in a vicinity of a junction of the cylindrical portion and the bottom plate portion, the communicating hole passing through the cylindrical portion in a direction that crosses an axial direction.

2. The spindle motor according to claim 1, wherein
the communicating hole is arranged to extend obliquely with respect to the central axis; and
an axial position of the communicating hole is arranged to become higher as the communicating hole extends from an inner side toward an outer side of the cylindrical portion.

3. The spindle motor according to claim 1, wherein at least a portion of an opening portion of the communicating hole defined in the inner circumferential surface of the cylindrical portion is arranged below the bearing mechanism.

4. The spindle motor according to claim 1, wherein the communicating hole is arranged to extend from an inner side to an outer side of the cylindrical portion at a constant height.

5. The spindle motor according to claim 1, wherein opening portions of the communicating hole defined in the inner circumferential surface and an outer circumferential surface of the cylindrical portion are both circular.

6. The spindle motor according to claim 4, wherein both circumferential edges of the communicating hole are in a shape of a circular arc in a cross-section perpendicular to the axial direction.

7. The spindle motor according to claim 1, wherein a lower end portion of the bearing mechanism and an upper surface of the bottom plate portion are arranged axially opposite to each other with a gap therebetween.

8. The spindle motor according to claim 1, wherein
the base member is made of a metal;
at least a portion of a surface of the base member is coated with an electrodeposition coating film; and
the metal is exposed on the inner circumferential surface of the cylindrical portion.

9. The spindle motor according to claim 1, wherein the bearing mechanism includes a sleeve defined by a single member.

10. A disk drive apparatus comprising:
the spindle motor of claim 1;
an access portion arranged to perform at least one of reading and writing of information from or to a disk supported by the rotating portion of the spindle motor; and
a cover arranged to define a case together with the base member; wherein
the rotating portion and the access portion are housed in the case defined by the base member and the cover.

11. The disk drive apparatus according to claim 10, wherein an interior of the case is filled with helium, hydrogen, a gas mixture of helium and hydrogen, or a gas mixture of air and any one of helium, hydrogen, and the gas mixture of helium and hydrogen.

* * * * *